United States Patent [19]

MacMillan

[11] 4,111,732
[45] Sep. 5, 1978

[54] PROCESS OF AND MOLDS FOR APPLYING PRECURED RUBBER TIRES AND OTHER OBJECTS

[76] Inventor: Kenneth T. MacMillan, 4992 Wesleyan Woods Dr., Macon, Ga. 31204

[21] Appl. No.: 454,003

[22] Filed: Mar. 22, 1974

[51] Int. Cl.² .......................................... B29H 17/36
[52] U.S. Cl. ...................................... 156/96; 156/394
[58] Field of Search ............ 156/394, 394 EN, 128 R, 156/96, 104

[56] References Cited

U.S. PATENT DOCUMENTS

| Re. 15,120 | 6/1921 | Pfeiffer | 156/394 FM |
|---|---|---|---|
| 2,766,006 | 10/1956 | Kraft | 156/394 FM |
| 2,976,910 | 3/1961 | Nowak | 156/96 |
| 3,307,999 | 3/1967 | Boicey | 156/104 |
| 3,563,831 | 2/1971 | Clapp | 156/394 |
| 3,729,358 | 4/1973 | Barefoot | 156/394 FM |
| 3,738,893 | 6/1973 | Edler | 156/394 |
| 3,745,084 | 7/1973 | Schelkmann | 156/394 FM |
| 3,779,832 | 12/1973 | Reppel | 156/394 FM |
| 3,802,977 | 4/1974 | Wasko | 156/96 |
| 3,809,592 | 5/1974 | Dennis et al. | 156/394 |
| 3,871,941 | 3/1975 | Wasko | 156/96 |

FOREIGN PATENT DOCUMENTS 1,109,526  9/1955  France ........................ 156/394 FM

*Primary Examiner*—John E. Kittle

[57] ABSTRACT

The present disclosure is directed to a novel process of and molds for applying rubber, preferably precured rubber, to tires and other objects, wherein in a preferred form of the invention a generally annular matrix is provided defined by a pair of relatively movable annular matrix portions, the pair of movable annular matrix portions defining an annular housing in a closed position thereof in which a tire is adapted to be retreaded, a bladder within the housing, the bladder including opposite annular edges, means for securing both annular edges to but one of the matrix portions whereby the bladder and the one matrix portion define a pressurization chamber, and means for pressurizing the interior of the chamber augmented by ancillary heating to achieve retreading of the tire.

In further embodiments of the invention tire wall plates of rigid, resilient or pneumatic structure are provided and in lieu of the bladder described a plurality of bladders tubular or having annular edges connected to associated matrix portions may be provided.

10 Claims, 16 Drawing Figures

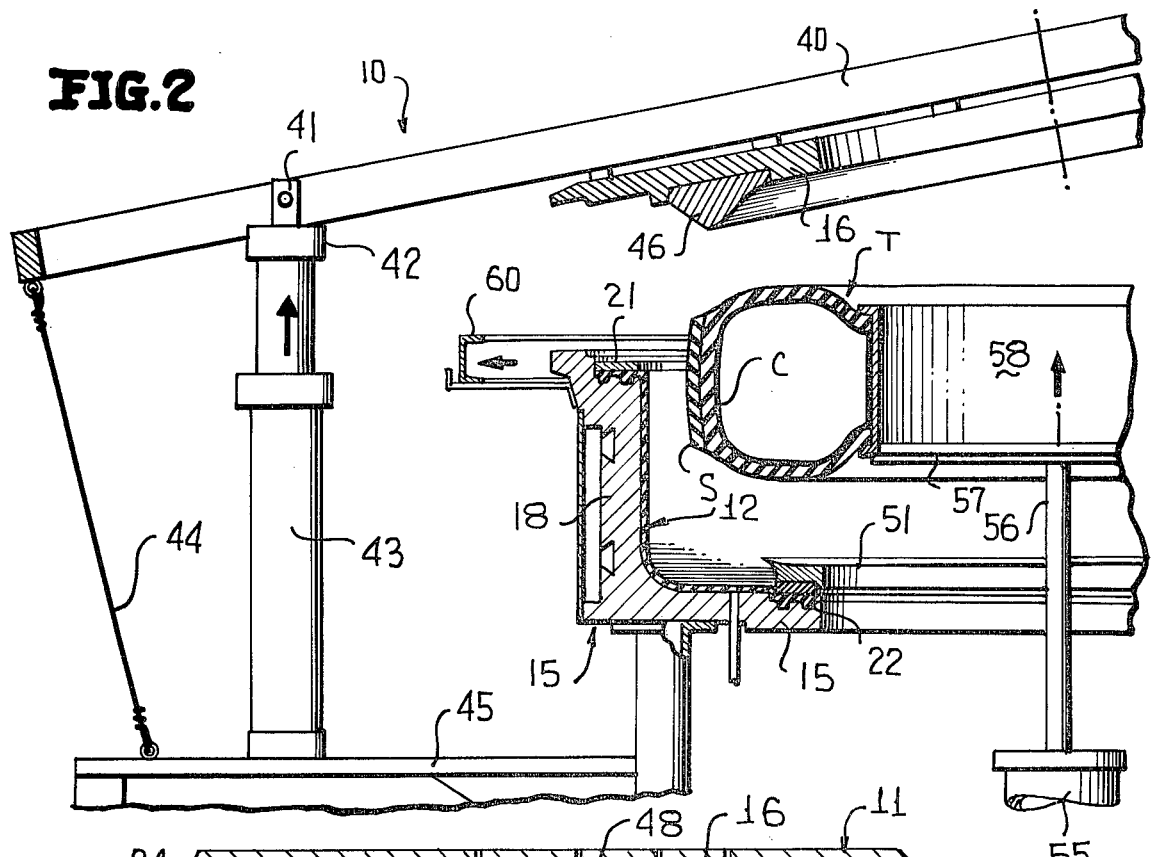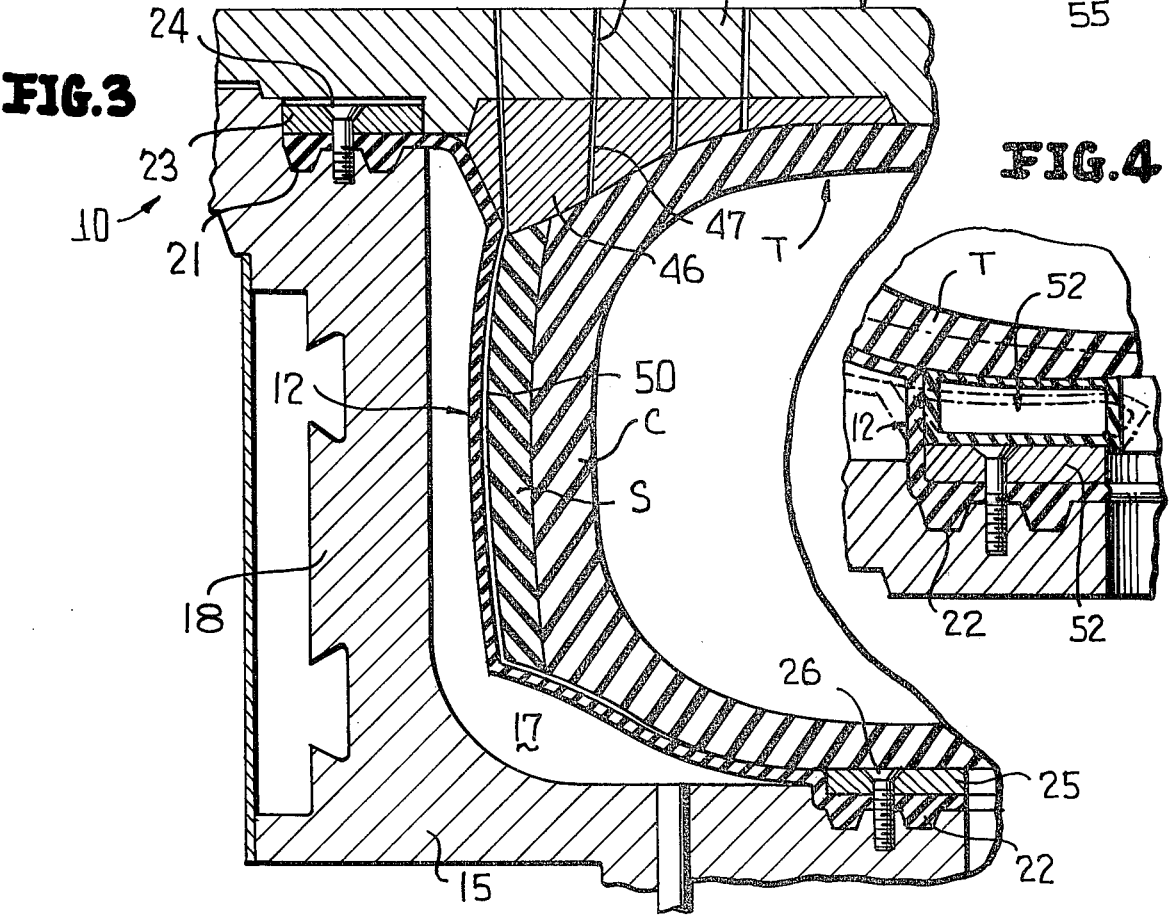

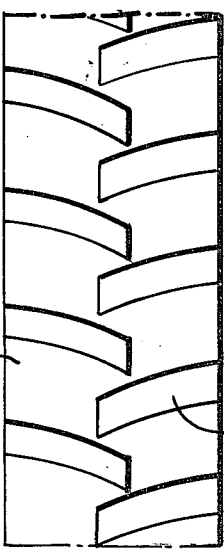
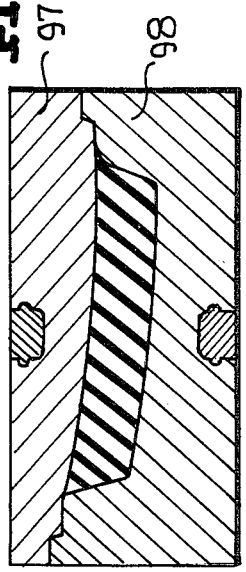
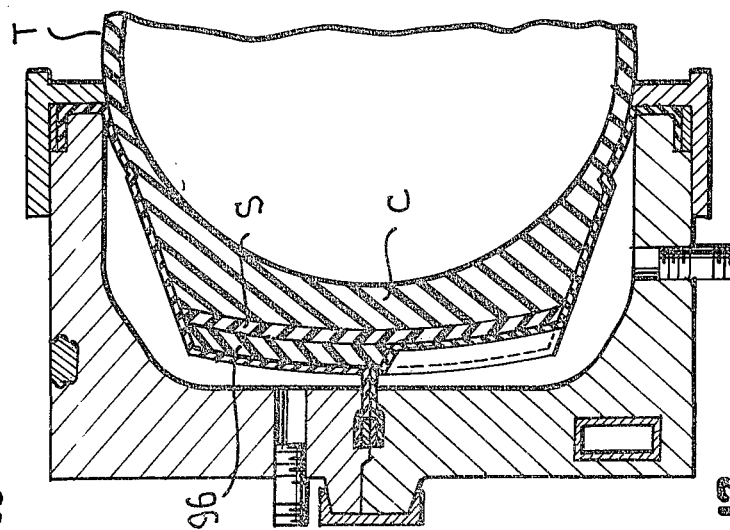
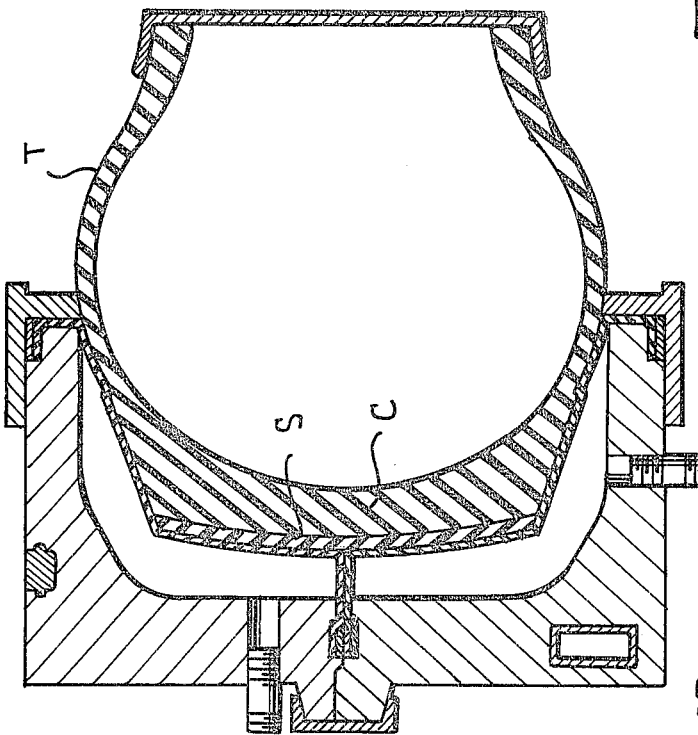

PROCESS OF AND MOLDS FOR APPLYING PRECURED RUBBER TIRES AND OTHER OBJECTS

The present invention is directed to an apparatus or machine for treading new tires and/or retreading or recapping or repairing vehicle or similar tires by employing non-compressible, non-expandable and non-combustible media which is/or introduced under high pressure into a generally annular chamber at least in part defined by a resilient bladder with the tire to be recapped positioned externally of the bladder and internally of an associated matrix chamber. Preferably the bladder is part of a closed liquid or similar medium circuit which includes a high pressure pump for pressurizing the liquid, or equivalent structure, with the primary aim being that of assuring rapid recirculation of the liquid through the chamber to assure excellent temperature control for curing purposes. Preferably the rubber applied to the tire crown is precured and due to the extremely high pressure involved it will become extremely dense which will substantially increase tread mileage. Moreover, the non-expandable and non-compressible nature of the medium will provide an intimate positive bond between the new tread and the tire carcass. Moreover, since the heated liquid or rather media is continually circulated, not only is temperature control assured, but curing time over conventional apparatuses is subantially reduced since the tire is heated from the outside resulting in curing time for conventional tires of approximately one-half hour and for some large truck tires curing is achieved in half time of known methods without adverse effects upon relatively non or low-heated tire side walls.

Preferably the machine includes as part of a closed liquid circuit a high pressure pump for pressurizing the liquid but in the event of any leakage and/or rupture in the liquid circuit, including the expansible bladder, means are provided for discontinuing the operation of a pump or equivalent structure which, of course, is an added safeguard beyond that of employing a non-combustible liquid. Specifics of the latter are more fully disclosed in commonly assigned now abandoned application Ser. No. 81,342 in the name of Kenneth T. MacMillan entitled APPARATUS FOR AND METHOD OF RETREADING TIRES and a corresponding continuation application thereon filed Feb. 9, 1973 under Ser. No. 331,183, now U.S. Pat. No. 3,847,631 the contents of both of which are herein incorporated by reference.

In keeping with a further object of this invention the matrix is preferably constructed in a variety of different ways, primary among of which is the formation of a pair of matrix portions one of which is generally of an L-shaped cross section and the other of which is provided with a back-up side wall ring which may be solid, resilient, or formed as an annular tubular bladder with in each case the matrix of the L-shaped transverse configuration also including a bladder which can be pressurized to urge base rubber stock against the tire crown under sufficient heat and pressure to achieve a dense cure.

A further object of this invention is to provide a novel retreading machine of the type heretofore described wherein the bladder may be simply a generally annular non-tubular shaped material which has a pair of annular edges each secured to opposite edges of the one and same matrix portion.

A further object of this invention is to provide a novel tire retreading machine of the type heretofore described wherein the bladder may be a single tubular element or a pair of tubular elements, or alternately an annular sheet, one of which is secured to each of a pair of matrix portions, and in all cases a pressurized chamber is defined thereby for urging rubber stock against a tire crown under sufficient heat and pressure to achieve dense curing.

A further object of this invention from a method standpoint is that of first applying base rubber to the crown of a tire in any of the molds of the type heretofore described, thereafter applying precured lugs to the base stock, and again repressurizing the bladder or bladders involved to achieve intimate lug-to-base stock adherence.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a side elevational view partially in cross section of a novel retreading machine constructed in accordance with this invention, and illustrates an annular matrix defined by a pair of matrix portions, a lower one of which is of a generally L-shape configuration in transverse cross section and has secured to remote ends thereof an annular bladder which defines a pressurization chamber for urging the bladder under heat and pressure against new rubber stock applied to the crown of a conventional vehicle or similar tire.

FIG. 2 is a fragmentary side elevational view partly in cross section similar to the illustration in FIG. 1, and illustrates the manner in which a cured tire is removed from the matrix after a matrix portion has been elevated by a fluid motor and the bladder has been deflated into conformity with the internal surface of its associated matrix portion to preclude scuffing, cutting, or the like upon subsequent reloading of the matrix.

FIG. 3 is an enlarged fragmentary sectional view of the left-hand portion of the closed matrix of FIG. 1, and illustrates details of the bladder including diagonal vents thereof which are associated with vent openings in one of the matrix portions.

FIG. 4 is a fragmentary sectional view of a modification of the retreading machine of FIGS. 1–3, and illustrates the manner in which a rigid side wall plate can be replaced by a resilient and/or annular tubular back-up element.

FIG. 10 is a diagrammatic illustration of a novel process of this invention, and depicts the manner in which new rubber and lugs may be applied to relatively heavy duty vehicle wheels.

FIG. 11 is a fragmentary sectional view of a precured lug disposed in a mold which upon removal therefrom is applied with similar lugs to the base stock of a tire applied in the manner illustrated in FIG. 12.

FIG. 12 is a fragmentary sectional view of a retreading mold similar to that illustrated in FIG. 5, and illustrates the manner in which base rubber stock is applied to the crown of an associated tire prior to the application of lugs thereto.

FIG. 13 is a view similar to FIG. 12, and illustrates the manner in which the bladders of FIG. 12 conform to the lugs applied to the base stock of the tire of FIG. 13.

FIG. 14 merely illustrates one of many typical lug designs which may be applied to the tire of FIGS. 12 and 13.

Figure 15:
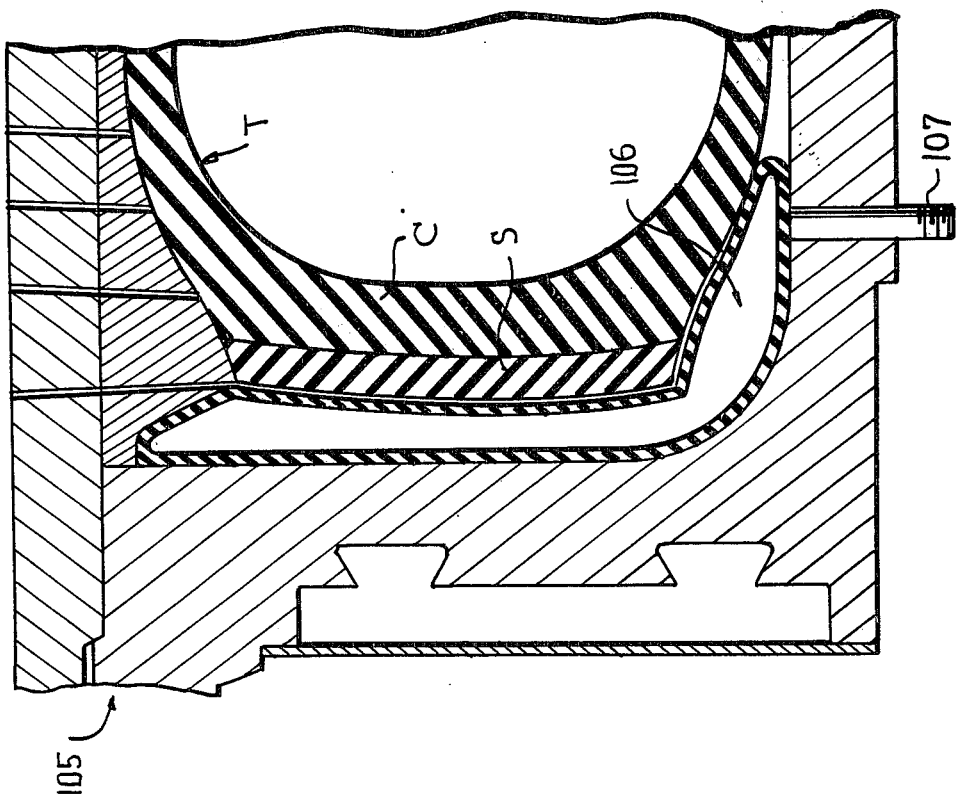

FIG. 15 is a fragmentary cross-sectional view of another matrix constructed in accordance with this invention and illustrates the manner in which a pair of annular tubular bladders are employed to achieve new rubber stock to tire crown adherence.

Figure 16:
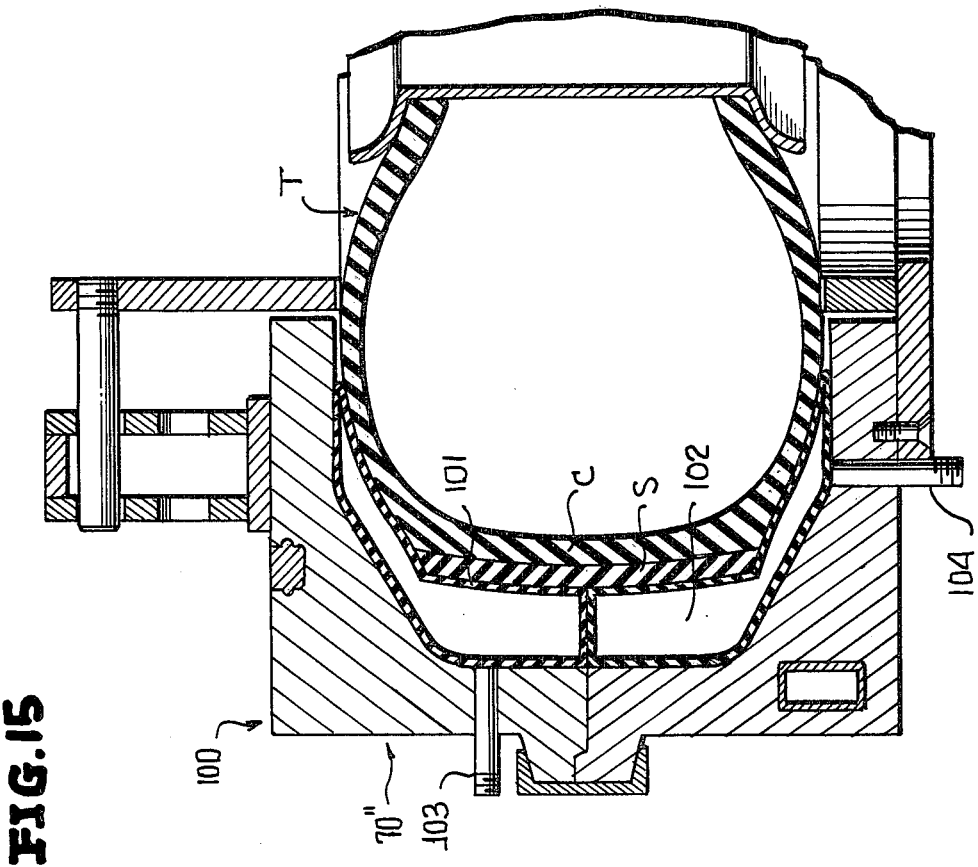

FIG. 16 is a fragmentary sectional view of another embodiment of this invention, and illustrates the manner in which a single tubular bladder may be employed to achieve complete across-the-crown pressurization similar to that of the non-tubular bladder of FIG. 3.

A novel apparatus or machine constructed in accordance with this invention for retreading vehicle or similar tires is generally designated by the reference numeral 10 (FIGS. 1–3) and includes as components thereof a matrix or mold 11, a flexible annular curing bladder 12, and a closed liquid circuit or system 14.

The matrix 11 is constructed from metallic material in the form of a pair of annular matrix portions 15, 16 which in the closed position thereof (FIGS. 1 and 3) define a generally annular internal cavity, housing or chamber 17 which receives at least the tread or crown portion C of a tire T.

The matrix portion 15 is of a generally L-shaped configuration defined by an annular or peripheral wall 18 and a radial wall 20 disposed generally normal thereto. The bladder 12 is simply an annular sheet of rubber or similar flexible material which may, if desired, be suitably reinforced to withstand high pressures associated with the operation of the apparatus 10, as will be described more fully hereinafter. The bladder 12 includes opposite edges having a pair of stepped projections (unnumbered) with the edges being designated by the reference numeral 21, 22. The edge 21 is suitably secured by an annular plate 23 (FIG. 3) and associated bolts 24 to the upper face (unnumbered) of the wall 18 whereas the opposite annular edge 22 is likewise secured to a face (unnumbered) of the wall 15 by another annular plate 25 (FIG. 3) and associated bolts 26. In this manner the bladder 12 and the inner surfaces (unnumbered) of the walls 18, 20 define a pressurization chamber 17 into which is introduced and circulated a non-compressible, non-expandable and non-combustible liquid or similar media to effect a curing operation in a manner to be described more fully hereinafter.

The closed liquid circuit 14 for achieving pressurization of the chamber 17 includes in addition to the bladder 12 one or more hollow conduits 30, 31 which are connected to a tank 32 or similar reservoir for a pressurization liquid having the characteristics heretofore noted. The tank 32 includes as a part thereof a high-pressure pump of a conventional construction as well as a conventional heater which may be, for example, a simple thermostatically controlled emersion heater located in the interior of the tank 32. An in-line pressure gauge 33 of a conventional construction is responsive to rapid depressurization which may occur due to leakage, bursting of the bladder 12, etc., and upon such detection the operation of the pump associated with the tank 32 is terminated. Assuming, for example, that the pump within the tank 32 is conventionally operated from an electrical source, the output of the gauge 33 may manually, pneumatically or electrically open the pump circuit by a suitable signal, as indicated by the headed arrow 33 to thus deenergize the pump and preclude the liquid from being undesirably expelled from the system 14, thus precluding attended damage to the apparatus 10, personnel, etc.

In a like manner an in-line pressure gauge 35 functions identically as the gauge 33 to terminate the operation of the pump by an appropriate signal transferred over a conduit 36. Thus under normal conditions the liquid or similar media can be circulated through the pressurization chamber 17 or by suitable valving entrapped therein as may be desired but under any circumstances controls are provided to assure desired levels of pressure and heat applied to new rubber stock S applied to the crown C of the tire T during a retreading operation.

Figure 1:
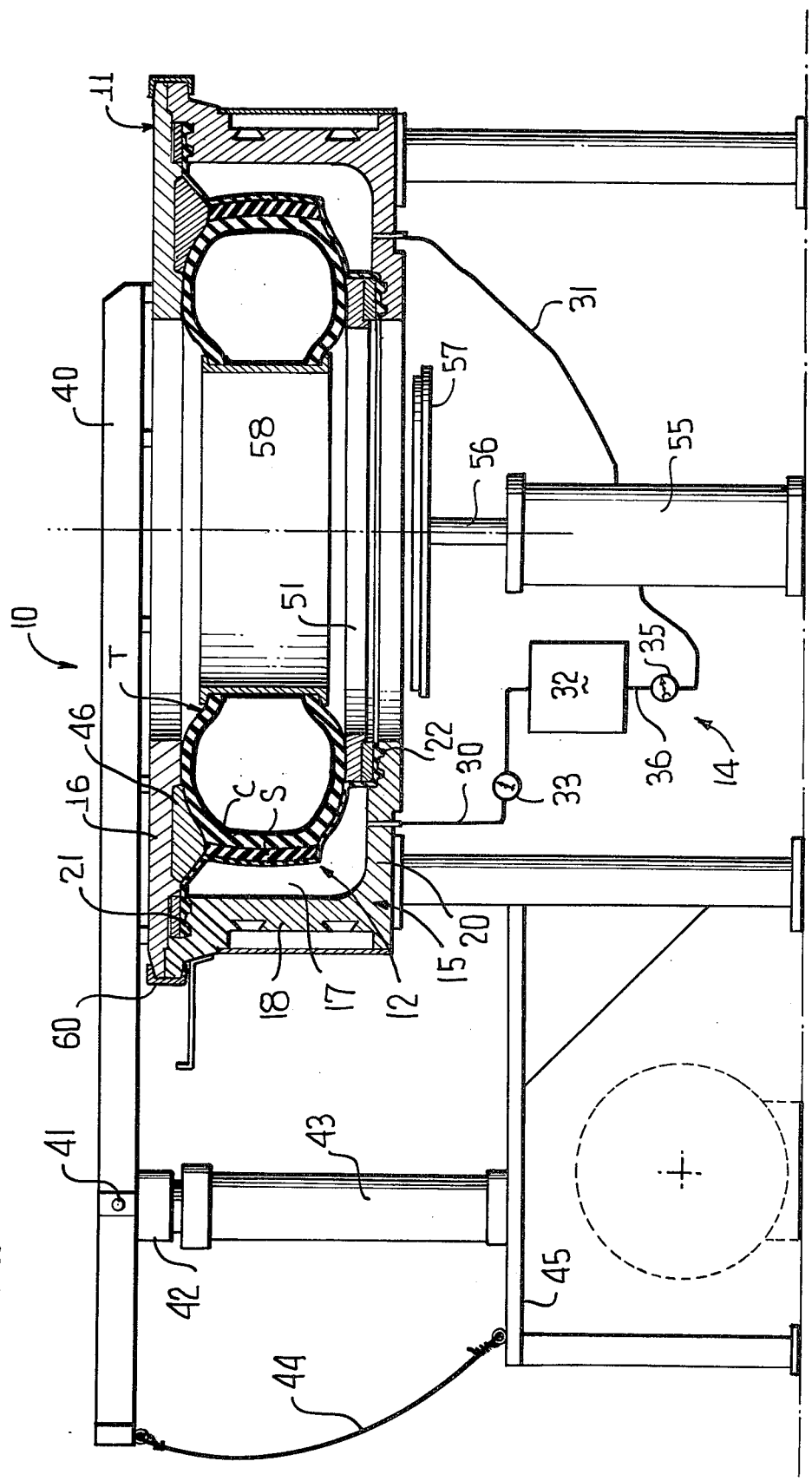

Reference is now made particularly to FIGS. 1 and 2 which illustrates the matrix portion 16 as an annular element being supported by an arm 40 pivoted at 41 to a piston rod 42 of a fluid motor 43, it being noted that an end (unnumbered) of the arm 40 remote from the matrix portion 16 is tethered by a cable 44 to a frame 45 of the machine 10. By suitably activating the fluid chamber 43 the piston 42 may be raised (FIG. 2) or lowered (FIG. 1) to move the matrix portion 16 between its open (FIG. 2) and closed (FIG. 1) positions.

The matrix portion 16 preferably carries a side wall plate 46 constructed of rigid metallic material suitably connected thereto and provided with venting apertures 47 (FIG. 3) which are in alignment with venting apertures 48 of the matrix portion 16. The apertures 47, 48 are disposed about the over-all area of the matrix portion 16 and the purpose thereof is to vent air to atmosphere from between the tire T, including the base rubber stock S, and the bladder 12. In this regard the surface (unnumbered) of the bladder 12 opposing the base rubber stock S is provided with diagonal grooves 50 about the entire annular extent of the bladder 12 which are in communication with many of the apertures 47 and thus in turn with the apertures 48 to assure venting or exhausting of air to atmosphere upon the performance of a retreading operation, as will be described more fully hereinafter.

The matrix portion 15 may likewise be provided with an annular side wall plate 51 (FIGS. 1 and 2), although the same may be omitted (FIG. 3) if found necessary or desirable. Likewise, though the side wall plates 46, 51 are contoured to the configuration of the exterior surfaces of the tire side walls (unnumbered) and are constructed from rigid generally metallic material, the same may likewise be constructed from resilient or flexible material, or as an alternative either may be in the form of an annular tubular bladder, as shown in FIG. 4 in which reference numeral 52 designates an annular tubular bladder seated upon the plate 25 in lieu of the rigid side wall plate 51. Likewise, a similar tubular bladder may be substituted in lieu of the rigid side wall plate 46 of the matrix portion 16.

The tire T is preferably lowered into the matrix portion 15 by another cylinder 55 having an associated piston 56 and a support plate 57, the latter of which is of a configuration to receive a rim 58 carrying the tire T.

In order to perform a recapping operation the operator first buffs the tire T and applies a fast cured cushion gum that is presently conventionally obtainable on the open market and thereafter applies the proper width and length of pre-cured tread or rubber stock S to the crown C. After applying the tread rubber S the operator can then insert an innertube in the tire (not shown) and a regular road rim for a conventional quick-change type curing rim or, if desired, a curing tube with a standard inside curing rim. As thus assembled and with the support 57 in uppermost elevated position the tire is seated thereupon and the support 57 is lowered until the tire T is seated within the matrix 15, much in the manner illustrated in FIG. 1.

After the tire has been placed in the lower matrix portion 15 the interior of the tire T, with or without a tube or liner, is inflated to approximately 40–50 p.s.i. to assure that the tire assumes its normal inflated shape but not overinflated as to chance a "blow-out." At this point the cylinder 43 is actuated to bring the matrix 16 to its closed position (FIGS. 1 and 3) after which a conventional locking ring 60 is moved from its open position (FIG. 2) to its closed position (FIG. 1). A suitable valve either within the line 30 or forming a portion of the gauge 33 is opened to allow a flowable, heat-conducting, non-flammable, non-compressible, non-evaporating material to be pumped by the pump of the reservoir 32 into the reservoir or pressurization chamber 17 between the matrix portion 15 and the bladder 12. One example of such medium is Chevron FR fluid #13 manufactured by Standard Oil which possesses characteristics of an essentially 20-weight oil except that the initials FR stand for fire resistant since liquid has a flash point of 1150° F. Moreover, liquid has no deleterious effect on butyl or similar rubbers from which the bladder 12 may be constructed. The E. F. Houghton & Co. Corporation of Philadelphia, Pa., likewise manufactures many similar liquids having flash points as high as 1300° F. which are termed their Vital Oil Synthetic Series. Numerous other liquids are available which satisfy the essential requirements of the present invention, namely, liquids or similar substances which are non-compressible, non-expandable, non-combustible above ambient temperature and more specifically when at a temperature of approximately 300° F. and pressures between 200–600 p.s.i. An alternative might be an emulsion of dry sand, possibly the use of glass beads, an emulsion of silicon and water, or similar material which will be under sufficient pressure to completely fill the pressurization chamber 17 but capable of being regulated so as not to distort or buckle the tire T during a retreading operation.

The material may be circulated through the system 14 or suitable valves, such as associated with the elements 33, 35, may be closed after the cavity has been sufficiently pressurized to force the bladder 12 into intimate relationship with the rubber stock S, as is best illustrated in FIG. 3. Thereafter the tire T will be further inflated to a desired curing pressure which under present normal designs and compounds of the ubber S now being available would be approximately 150 p.s.i. The tire T will then be cured at the temperature and time desired depending upon the particular materials involved which from a standard supplier recommend a matrix surface temperature for curing between 300°–330° F. and respective curing time periods of 1 hour, 40 minutes to 1 hour, 10 minutes. Once cured the pressures within the tire T and the chamber 17 are reduced and/or eliminated and with respect to the chamber 17 the fluid is completely extracted therefrom creating a vacuum whereupon air pressure will force the bladder 12 against the matrix (FIG. 2) when the upper matrix portion 16 is moved to its open position. This will permit the tire to be readily withdrawn from the matrix portion 15 and upon the introduction of a subsequent tire the bladder will not be scuffed or otherwise abraded or marred upon the introduction of the tire thereinto, as might occur if, for example, the bladder 12 were simply in a relatively flaccid condition opposing the introduction of a tire within the matrix 15.

Figure 5:
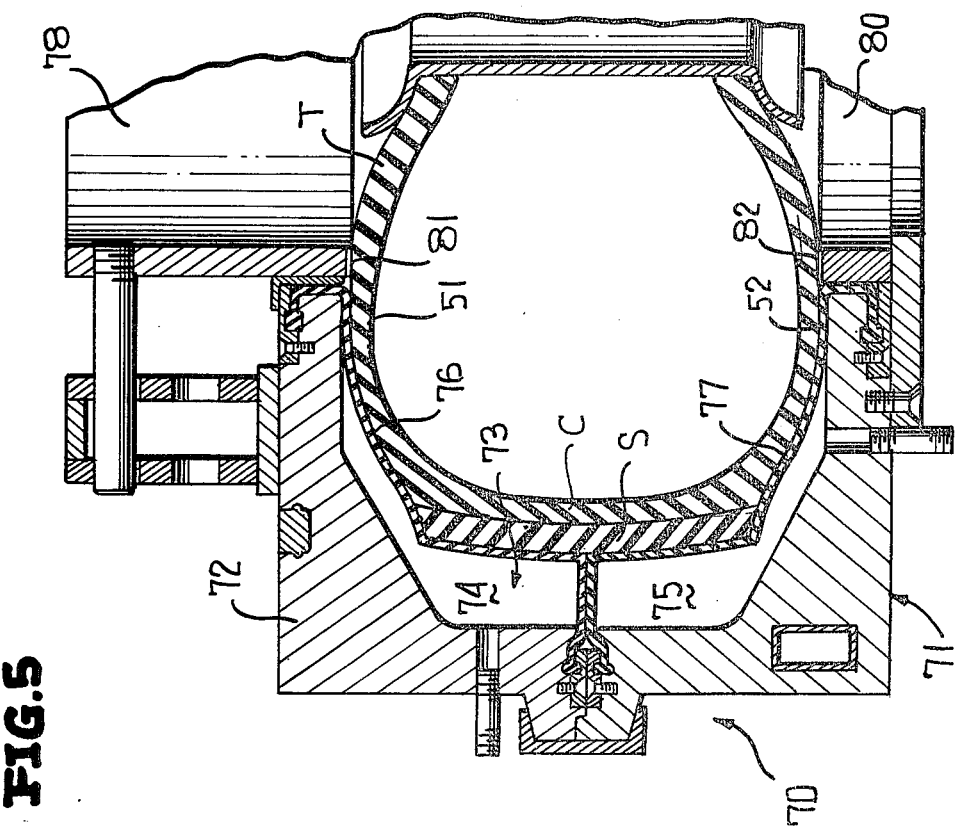
FIG. 5 is a fragmentary sectional view of another embodiment of this invention similar to the illustrated area of FIG. 3, and illustrates a pair of matrix portions, each of which includes a pressurization chamber defined by an internal surface of the matrix portion and an annular bladder having opposite edges secured to remote ends thereof.

Reference is now made to FIG. 5 of the drawings which illustrates another mold or matrix 70 which includes matrix portions 71, 72 which in the closed position thereof meet along a parting line or plane (unnumbered) which is normal to the matrix axis and essentially bisects the annular matrix housing or chamber 73 into two equal halves 74, 75 with the latter two elements defining pressurization chambers in conjunction with respective bladders 76, 77. The bladders 76, 77 are annular flexible (rubber or the like) elements whose opposite edges (unnumbered) are clamped or otherwise conventionally secured in the manner clearly illustrated in FIG. 5 to remote edges of the respective matrix portions 72, 71. Thus, in conjunction with the operation of the apparatus 10 of FIG. 1 the matrix 70 operates in a like manner except both pressurization chambers 74, 75 are incorporated in the system 14 to impart heat and pressure to the tread or stock S applied to the crown C of the tire T.

Figure 6:
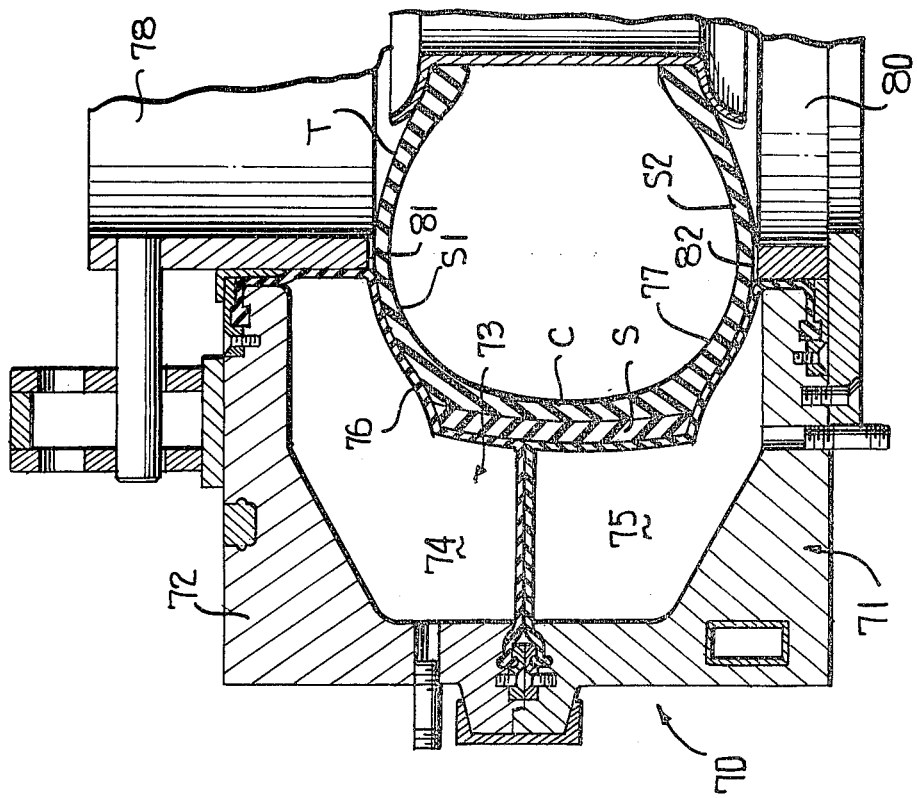
FIG. 6 is a fragmentary sectional view similar to FIG. 5 illustrating the identical structure, but illustrates the manner in which a relatively smaller vehicle tire can be retreaded in the same matrix through the use of at least one annular or cylindrical side wall plate which is adjustable to vary the mold cross-section thereby to accommodate tires of varying sizes.

The matrix 70 also includes a pair of annular or peripheral side wall plates 78, 80 having opposing annular surfaces 81, 82 which engage the exterior of side walls S1, S2, respectively, of the tire T. The side wall plates 77, 78 are conventionally secured in opposing relationship to each other with the side wall plate 80 being preferably permanently attached to the matrix 71 in a rigid manner whereas the side wall plate 78 may be adjusted vertically upwardly or downwardly as viewed in FIG. 5 with respect to the plate 70. In this manner, assuming that the tire T of FIG. 5 is the largest tire capable of being cured in the matrix 70, smaller tires may be cured therein in the manner illustrated in FIG. 6 by simply descending the side wall plate 78 and securing the same in the position illustrated to not only engage the side wall S1 but back-up the portion of the bladder 76 contacting the same. In other words, though the matrixes 70 of FIGS. 5 and 6 are identical in construction the bladders 76, 77 are constructed to normally accommodate the outer profile of the largest tire which can be accommodated within the annular chamber 73 and upon the introduction of smaller size tires therein the bladders 76, 77 will stretch to accommodate to the smaller size tires. In other words, in keeping with this invention the bladders 76, 77 and all the bladders herein referred to are designed to fit tires that require the least amount of stretch and then are allowed to stretch to fit larger sizes. The theory is simply that rubber or like material can stretch more easily than it can compress which in the latter case could cause folds capable of preventing equal pressure over and around those portions of the tire embraced thereby.

Figure 7:
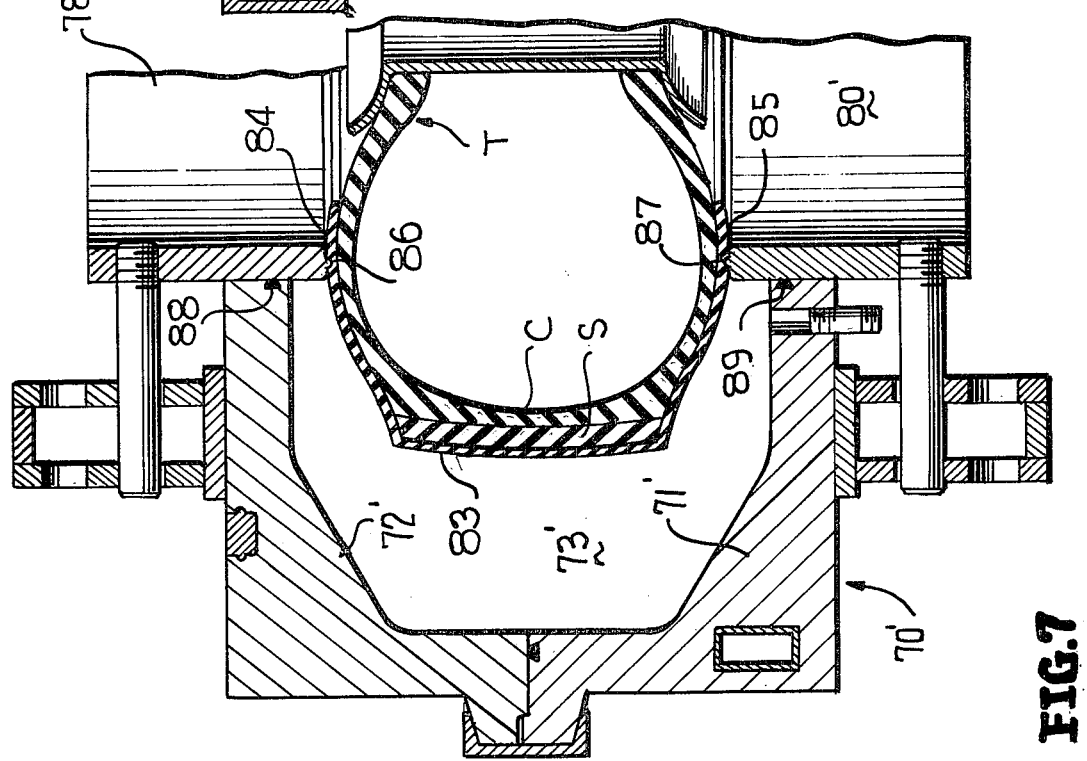
FIG. 7 is a fragmentary sectional view of another embodiment of this invention, and illustrates a bladder associated with a matrix which is unconnected with respect to the matrix portions and is simply sealed with respect to a chamber thereof by a pair of adjustable side plates.

Reference is now made to FIG. 7 wherein like reference numerals corresponding to those of FIGS. 5 and 6 have been applied except that the same have been primed to indicate identical structure. Essentially the basic difference between the matrix 70' of FIG. 7 and that of the matrix 70 of FIGS. 5 and 6 is that a bladder 83 of an annular configuration is not secured to the matrix portions 71', 72' but instead is overlaid upon the tire T, the rubber stock S, and terminal ends or edge portions 84, 85 are seated against annular beads 86, 87 of the respective side wall plates 78', 80', which form seals precluding the escape of the medium from the interior of the annular matrix housing 73 to atmosphere. Annular O-ring or similar seals 88, 89 are also provided to assure the absence of leakage of the medium from the annular matrix housing 73' to atmosphere between the matrix portions 71', 72' and the respective side wall plates 80', 78'.

Figure 9:
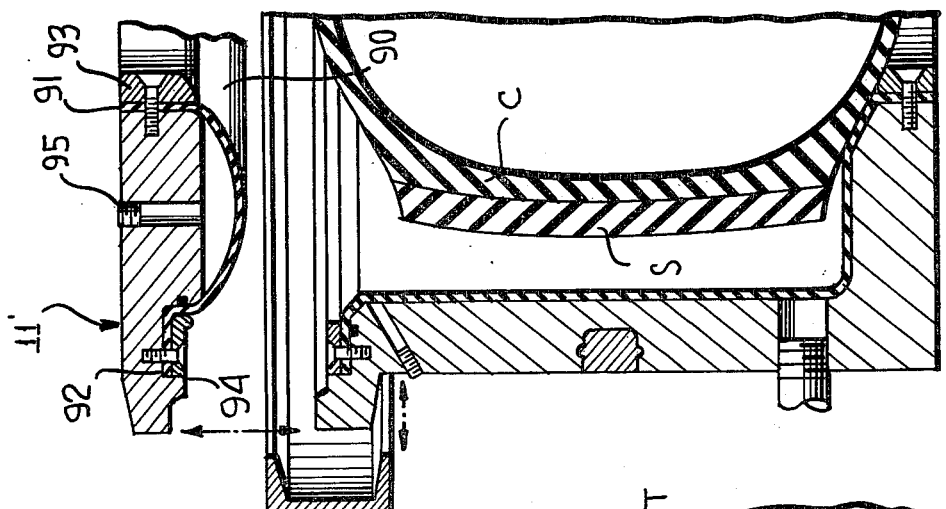
FIG. 9 is a fragmentary sectional view of the apparatus shown in FIG. 8, and illustrates the manner in which the components are unlocked and moved toward an open position thereof.
Figure 8:
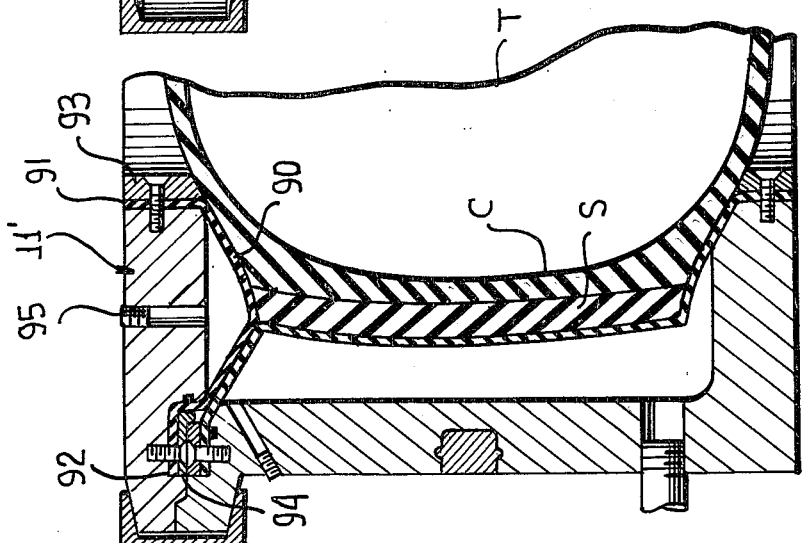
FIG. 8 is a fragmentary sectional view of a portion of another retreading machine constructed in accordance with this invention and illustrates the manner in which a bladder may be employed in lieu of a rigid side wall plate.

Referring to FIGS. 8 and 9 of the drawings, reference numerals corresponding to those applied to FIGS. 1–3 have been applied thereto except being primed to indicate like structure. However, in lieu of the rigid side wall plate 46 (FIG. 3) the upper matrix portion 11' includes an annular bladder 90 having opposite annular edges 91, 92 secured by respective annular plates 93, 94 and associated bolts (unnumbered) to the matrix 11'. A suitable inlet conduit 95 permits the introduction of pressurized liquid into the interior of the bladder 90 and remote therefrom (180°) is an outlet conduit or port (not shown) to achieve circulation and/or entrapment of pressurized and heated (if desired) liquid within the bladder 90. The importance of a flexible bladder 90 is the readiness thereof to conform to exterior configurations of the tire T, as is readily apparent from FIG. 8. Under certain circumstances it may not be desirable to apply heat to the tire side walls and thus the fluid within the bladder 90 may be simply pressurized and not heated. In the latter case it would be unnecessary to fill and/or drain the bladder 90 for each operation although if found necessary or desirable the bladder 90 may be incorporated in a system corresponding to that of the system 14 of FIG. 1.

Reference is now made to FIGS. 10–14 of the drawings which utilizes the matrix 70 of FIGS. 5 and 6 to demonstrate the manner in which the present invention may be utilized for retreading or more particularly relugging heavy equipment tires, such as road graders. FIG. 14 illustrates a typical lug arrangement in which a band 95 of precured rubber having lugs 96 is formed in a conventional manner in a pair of mold portions 97, 98 (FIG. 11). The band 95 of lug material is therefore molded and cured as a first step (FIG. 10) in the performance of the process after which the crown C of the tire T (FIG. 12) is appropriately pre-treated by removing old lugs, buffed, and renewed by applying rubber stock S thereto, and achieving the retreading of the stock S to the crown C of the tire T in the same manner as that described with respect to FIGS. 1–3. However, once the latter portion of the process has been accomplished, the band 95 of lugs 96 is then applied to the stock S and the tire T is reintroduced into the matrix 70 and the curing under heat and pressure is achieved, noting in particular the manner in which the bladders 76, 77 conform not only to the lugs 96 but to the spaces (unnumbered) therebetween. Once the lug strip 95 has been cured to the base stock S the pressurization within the chambers 74, 75 may be decreased and the tire withdrawn therefrom.

Another machine constructed in accordance with this invention is generally designated by the reference numeral 100 (FIG. 15), and insofar as the matrix 70" is concerned the same corresponds to that of the matrix 70 of FIGS. 5 and 6 and has hence been provided with like though double primed reference numerals. However, in contradistinction to the matrix 70 of FIGS. 5 and 6 the matrix 70" includes a pair of annular tubular bladders 101, 102 having respective pressurization media inlets 103, 104 and corresponding outlets (not shown). Essentially the operation of the machine 100 is identical to that described with respect to FIGS. 5 and 6 except that the pressurizing heated media is confined completely internally of the annular bladders 101, 102.

Reference is now made to FIG. 16 of the drawings which illustrates another machine 105 identical to the machine 10 of FIGS. 1–3 with respect to those components which have been double primed. However, in this case a bladder 106 is of an annular and totally tubular configuration and includes a pressurization median inlet 107 and a corresponding outlet (not shown). Thus, pressurization liquid and/or dispersions introduced into the bladder 106 operates in the same manner as that described with respect to the machine 10 except, of course, that the introduced liquid is confined wholly and totally within the bladder 106.

While preferred forms and arrangement of parts have been shown in illustrating the invention, it is to be clearly understood that various changes in details and arrangement of parts may be made without departing from the scope and spirit of this disclosure.

I claim:

1. A tire retreading machine comprising a generally annular matrix defined by at least a pair of relatively movable annular matrix portions, said pair of movable annular matrix portions define in a closed position thereof a generally annular housing adapted to receive a tire which is to be retreaded therein, a bladder within said annular housing, said bladder includes opposite annular edges, means for securing both annular edges to but one of said matrix portions whereby said bladder and one matrix portion define a pressurization chamber, means for pressurizing the interior of said chamber, said one matrix portion includes a peripheral surface and an annular surface adjacent thereto which in transverse cross-section define a generally L-shaped configuration, said bladder bearing against one shoulder and tread of the tire, and another of said matrix portions includes an annular surface opposing said first mentioned annular surface thereby imparting a generally C-shaped configuration to said matrix interior in its closed position, and said last portion of said matrix being shaped to bear against the other shoulder of the tire.

2. The tire retreading machine as defined in claim 1 wherein said annular surface of said another matrix portion is a rigid element.

3. The tire retreading machine as defined in claim 1 wherein said annular surface of said another matrix portion is a resilient element.

4. The tire retreading machine as defined in claim 1 wherein said annular surface of said another matrix portion is another annular bladder having opposite annular edges, means for securing both said last-mentioned annular edges to said another matrix portion, and means for pressurizing said interior of another chamber defined by said another annular bladder and said another matrix portion to conform to said other shoulder of said tire.

5. The tire retreading machine as defined in claim 1 wherein said another matrix portion includes means for venting said area of said housing between said tire and bladder to atmosphere.

6. The tire retreading machine as defined in claim 1 including groove means in a surface of said bladder exteriorly of said chamber for venting an area of said housing between said tire and bladder to atmosphere.

7. The tire retreading machine as defined in claim 1 including means for decreasing the pressure within said chamber interior sufficient to permit the collapse of said bladder to the interior configuration of said one matrix portion.

8. The tire retreading machine as defined in claim 1 wherein said another matrix portion is of an L-shaped configuration, and said annular surface of said another matrix portion is defined by an annular bladder having opposite annular edges secured to said another matrix portion.

9. The tire retreading machine as defined in claim 1 wherein said another matrix portion is generally of a flat annular configuration, and said annular surface of said another matrix portion is defined by an annular bladder having opposite annular edges secured to said another matrix portion.

10. A method of retreading tires in an annular matrix defined by a pair of relatively movable annular matrix portions wherein one of the matrix portions includes a peripheral surface and an annular surface adjacent thereto which in transverse cross-section define a generally L-shaped configuration comprising the steps of applying base rubber to at least the crown of a tire, positioning the tire at least partially within the matrix with the applied base rubber in opposed relationship to the bladder, pressurizing an annular chamber in part defined by the bladder thereby urging the bladder against the base rubber, while thus under pressure applying heat to adhere the base rubber to the tire crown, depressurizing the annular chamber, removing the tire from the matrix, applying tread lugs to the base rubber, repositioning the tire at least partially within the annular matrix with the applied tread lugs in opposed relationship to the bladder, pressurizing the annular chamber to urge the bladder against the tread lugs, while thus under pressure applying heat to adhere the tread lugs to the base rubber, depressurizing the chamber, and removing the tire from the matrix.

* * * * *